United States Patent
Kowshik et al.

(10) Patent No.: US 7,143,257 B2
(45) Date of Patent: Nov. 28, 2006

(54) METHOD AND APPARATUS OF A SMART DECODING SCHEME FOR FAST SYNCHRONOUS READ IN A MEMORY SYSTEM

(75) Inventors: Vikram Kowshik, Cupertino, CA (US); Fai Ching, Fremont, CA (US); Steven J. Schumann, Sunnyvale, CA (US)

(73) Assignee: Atmel Corporation, San Jose, CA (US)

( * ) Notice: Subject to any disclaimer, the term of this patent is extended or adjusted under 35 U.S.C. 154(b) by 248 days.

(21) Appl. No.: 10/686,243

(22) Filed: Oct. 14, 2003

(65) Prior Publication Data

US 2005/0081011 A1   Apr. 14, 2005

(51) Int. Cl.
G06F 12/00 (2006.01)
G06F 13/00 (2006.01)

(52) U.S. Cl. .................. 711/167; 711/100; 711/154
(58) Field of Classification Search ............... 711/100, 711/154, 167; 365/194, 195, 230.03, 221, 365/189.12, 189.04, 193
See application file for complete search history.

(56) References Cited

U.S. PATENT DOCUMENTS

| | | | | |
|---|---|---|---|---|
| 5,384,745 A | * | 1/1995 | Konishi et al. | 365/230.03 |
| 5,594,704 A | * | 1/1997 | Konishi et al. | 365/233 |
| 5,610,874 A | | 3/1997 | Park et al. | 365/236 |
| 5,959,930 A | * | 9/1999 | Sakurai | 365/230.03 |
| 5,991,223 A | * | 11/1999 | Kozaru et al. | 365/230.03 |
| 6,065,092 A | * | 5/2000 | Roy | 711/5 |
| 6,088,291 A | * | 7/2000 | Fujioka et al. | 365/233 |
| 6,104,667 A | * | 8/2000 | Akaogi | 365/233 |
| 6,111,808 A | * | 8/2000 | Khang et al. | 365/230.06 |
| 6,115,319 A | * | 9/2000 | Kinoshita et al. | 365/233 |
| 6,125,421 A | * | 9/2000 | Roy | 711/5 |
| 6,324,118 B1 | * | 11/2001 | Ooishi | 365/233 |
| 6,560,668 B1 | | 5/2003 | Ryan et al. | 710/316 |
| 6,611,885 B1 | | 8/2003 | Ryan et al. | 710/39 |

* cited by examiner

*Primary Examiner*—Tuan V. Thai
(74) *Attorney, Agent, or Firm*—Schneck & Schneck; Thomas Schneck (57) ABSTRACT

An apparatus and method identify a plurality of words to be read, read these selected words during a clock latency period, and then shift these words out synchronously at an end of the latency period. In another aspect of the present invention, the above method of reading a plurality of words during a clock latency period and shifting them out synchronously after the latency period is facilitated by a two tier column decoder. The two-tier column decoder has two decoders. A first-tier decoder decodes a first group of words to be read during the latency period, and a second-tier decoder decodes subsequent words to be shifted out synchronously during a burst period.

10 Claims, 8 Drawing Sheets

| | Y ADDRESS BITS $A_i$ .... $A_4$ $A_3$ $A_2$ $A_1$ $A_0$ | WORD# | ADDR. FIELD |
|---|---|---|---|
| FIRST GROUP | 0 0 0 0 0 0<br>0 0 0 0 0 1<br>0 0 0 0 1 0<br>0 0 0 0 1 1 | 0<br>1<br>2<br>3 | I |
| | 0 0 0 1 0 0<br>0 0 0 1 0 1<br>0 0 0 1 1 0<br>0 0 0 1 1 1 | 4<br>5<br>6<br>7 | II |
| SECOND GROUP | 0 0 1 0 0 0<br>0 0 1 0 0 1<br>0 0 1 0 1 0<br>0 0 1 0 1 1 | 8<br>9<br>10<br>11 | III |
| THIRD GROUP | 0 0 1 1 0 0<br>0 0 1 1 0 1<br>0 1 1 1 1 0<br>0 1 1 1 1 1 | 12<br>13<br>14<br>15 | IV |
| | | 127 | |

METHOD AND APPARATUS OF A SMART DECODING SCHEME FOR FAST SYNCHRONOUS READ IN A MEMORY SYSTEM

TECHNICAL FIELD

This invention relates generally to a synchronous memory system. More specifically, this invention relates to a method and apparatus of a smart decoding scheme for a fast synchronous read in a memory system.

BACKGROUND ART

Typically, an integrated memory device includes a central processing unit (CPU), a memory array, I/O ports, and a controller. When data is requested, the CPU has to wait for data to come from the memory array. During this waiting period, the CPU appears to be busy, but actually it does not do anything. The speed and size of an integrated memory device are the two most critical factors in determining its performance.

In order to allow a memory device to operate at high speed, synchronous memory devices have been developed. A synchronous memory device can receive a system clock that is synchronous with the processing speed of the overall system. A modern synchronous memory system has two performance numbers. The first is latency, which is a delay between the time that a particular word is requested and the time when the memory can reliably transmit the word back to the CPU for processing. A second performance number is throughput; a rate at which a memory system can return additional data from the memory array once the latency period ends. This is often called a "burst period" because there is a burst of data transferring after the latency period. Furthermore, in new memory systems, fast synchronous data is expected out of the memory banks at clock cycle times that are far shorter than the random access capabilities of the current technologies.

Because speed and throughput are important factors in memory devices, there are many attempts to improve their performance. U.S. Pat. No. 6,560,668 B2, entitled "Method and Apparatus for Reading Write Modified Read Data in Memory Device Providing Synchronous Data Transfer" by Ryan et al., (hereinafter "the '668 Patent") pertains to synchronous dynamic random access memory (SDRAM). The '668 patent is concerned mainly with preventing data collisions at a memory array by use of interim address and data registers that store write address and input data until an available interval is located where no read data or read addresses occupy the memory array. During the available interval, data is transferred from the interim data register to a location in the memory array identified by the address in the interim array register. The memory device of the '668 patent juggles data and address between the interim registers and the memory array. This act is performed by arbitration circuits controlled by RAS and CAS controls. Data integrity is also checked for possibilities of data collisions. In the '668 patent, a sequence of three read commands followed by three write commands and three read commands are proposed to minimize data and address collisions. The '668 patent only teaches interim addresses to store the write addresses during read latency so that data collision can be avoided, thus improving throughput. However, the '668 patent does not teach improving of speed of the SDRAM.

Another attempt to improve speed and performance of a synchronous read only memory (RAM) is found in U.S. Pat. No. 5,610,874 by Park et al. (hereinafter "the '874 patent"). The '874 patent uses a high speed counter that uses a fast system clock to control a main decoder in burst mode. The technique in the '874 patent is a burst read without consideration to the physical limitation of read speeds due to parasitic delays and other analog sensing delays. However, the control circuits can be made fast but the ultimate data integrity is determined by proper sensing and latching of the data. Therefore, the implementation of a high speed counter to improve speed overlooks parasitic components that hinder the improvement of speed.

Neither of the above patents improved the speed of a memory device by utilizing the latency period to improve the reading speed. Furthermore, both patents require additional circuitry to avoid problems that could occur in a memory device, not performance per se. Avoiding problems that might occur means improving performance. But, the '668 patent avoid data collision problems by having interim data registers to store read commands and write commands. The '668 patent does not find a method to improve speed directly. While the '874 patent uses a fast counter to improve burst read, but it overlooks parasitic problems that worsen speed of the memory device.

Thus, there is a need to improve both throughput and speed of a memory device.

SUMMARY OF THE INVENTION

Accordingly, the objects of the invention are achieved by an apparatus and method that employ asynchronous reading during a latency period and synchronous burst thereafter. This method accordance to the present invention gainfully utilize the latency period to properly read and latch multiple words without unduly limiting the time for a proper sensing operation. The method reads during the latency period and shifts out the data synchronously afterward. Synchronous reading is achieved by first identifying a plurality of words to be read, reading these selected words during the clock latency period, and then shifting these words out synchronously at the end of the clock latency period. The step of reading a plurality of words during the latency period further includes the steps of checking the address field of the words to be read, determining whether a first address of word to be read belongs to a first address field or a subsequent address field. Once the address field has been determined, a first tier of the word is read into date registers. After a second tier is clocked out, the first tier is discarded. Next, the first tier of the subsequent word is loaded into data registers. Finally, at the end of the clock latency period, the subsequent group of words is synchronously clocked out.

In another aspect of the present invention, the above method of reading a plurality of words during the clock latency period and shifting them out synchronously after the clock latency period is facilitated by a two tier column decoder. The two-tier column decoder has two decoders. In the first tier column decoding, both low and high order words are selected during first read and either low or high order words for subsequent reads.

In the second tier column decoding the low and high order words are connected to their corresponding sense amplifiers during first read, following which either the low or high order words are routed to the same set of sense amplifiers. This way power can be saved in sense amplified that are idle after the first read.

BEST MODE FOR CARRYING OUT THE INVENTION

The speed of data acquisition from a memory device can be improved by reading a plurality of words during the latency period and then clocking them out synchronously at the end of the latency period. Additional words are successfully read during the burst read during clocking out of data to maintain a steady uninterrupted stream of new data as the burst read progresses. The synchronous reading can be achieved by a method that identifies a plurality of words to be read, reads these selected words during the latency period, and then shifts these words out synchronously at the end of the clock latency period. The step of reading a plurality of words during the latency period further includes the steps of checking an address field of the words to be read, determining whether a first address of the words to be read belongs to a first address field or other address fields so that a correct word order can be achieved between the latency period and the burst period. Once the address field has been determined, a first group of words is read into the data registers during the latency period.

At the end of the clock latency period, this data is synchronously clocked out. While the data is clocked out, a second group of words is read and ready to be clocked out at the end of the current data stream without any further latency delays.

Figure 1:
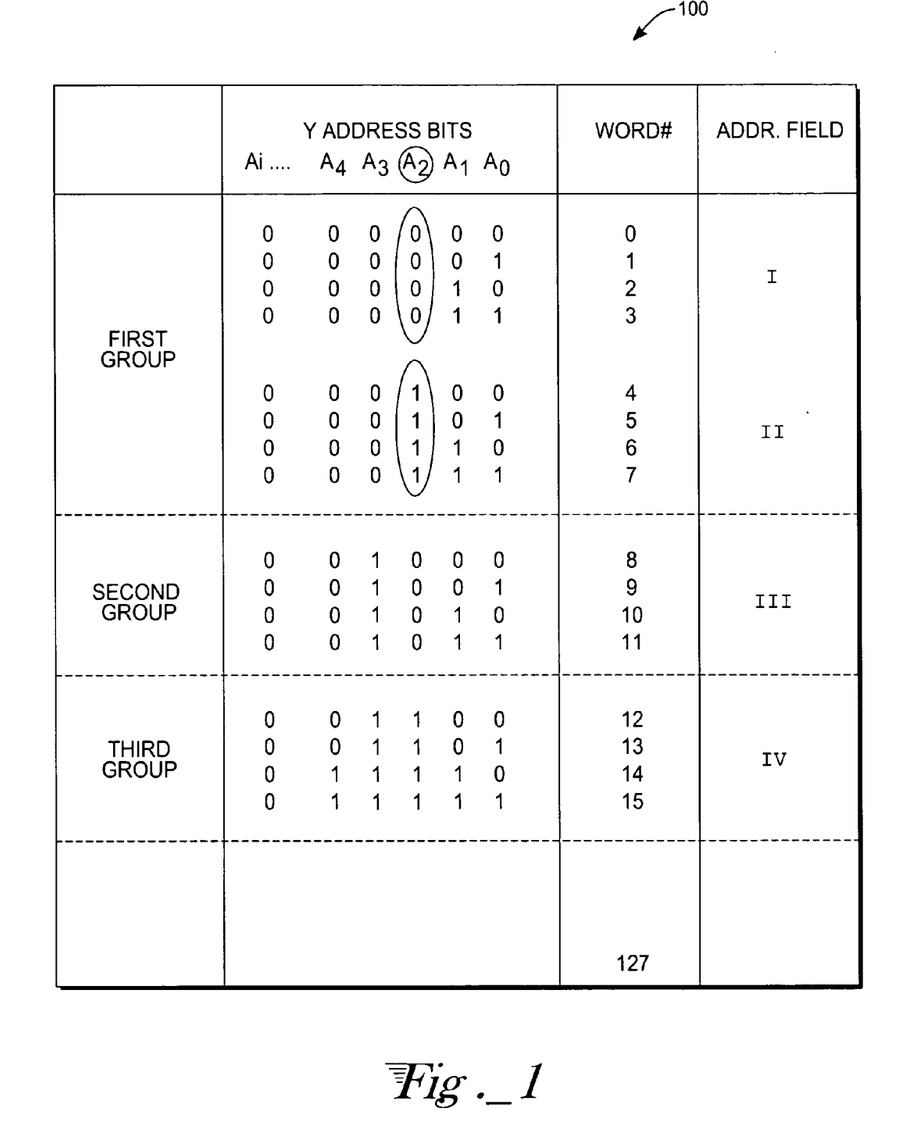
FIG. 1 illustrates a table showing the manner from which a two-tier decoder is derived based on the addresses of selected words to be read.

With reference to FIG. 1, table 100 illustrates addresses of a selected plurality of words to be read and a decoding scheme in accordance with the present invention. These words can be divided into different groups: a first group and subsequent groups. The first group and subsequent groups are identified by Y address bits, $A_0$ to $A_i$. The Y address bit is further divided into a first tier and a second tier.

In an exemplary embodiment, the initial group of words is 8 followed by 4 words. Therefore, the most significant bit address bit $A_2$ can be used to decode the first tier or the second tier of a group of words. If the first group of words to be read is word 0, the first tier includes word 0 to word 3. The address bit $A_2$ is 0 for the first tier. On the other hand, the address bit $A_2$ is 1 for the second tier. Similarly, for the subsequent group of words, the first tier starts from word 8 to word 11, with the address bit $A_2$ equal to 0. The second tier starts from word 12 to word 15, with the address bit $A_2$ equal to 1.

Thus, address bits $A_2$, $A_1$, and $A_0$ can be used to decode the words to be read. For example, if the address bit $A_2$ equals 0, and $A_1$, $A_0$ both equal 00, then the address must be for the word 0. On the other hand, if $A_2$ equals 1 and $A_1$, $A_0$ equal 00, then the address must be for word 4.

Because a first group of words can be any word in the selected plurality of words to be read, the decoding scheme further divides the address into address fields and even/odd addresses in order to keep track of words to be read during the latency period and during the burst period. For example, if the plurality of words selected to be read is words 6–11, the address of the first word is 110. As such, the two-tier decoder knows that the first word is in the address field II, and in odd address because the address bit $A_2$ equals to 1. See Table 100. The next words to be shifted out synchronously must be in address field IV because one group of words in the exemplary embodiment has eight words. If $A_2$ indicates the initial address of the plurality words to be in group II and either $A_0$ or $A_1$ is 1, then the subsequent group of words must be in group IV and it must be an odd address.

Therefore, with the decoding scheme as shown in table 100, the method of reading during latency and burst periods can be carried out with any words without confusion and/or errors. Furthermore, with this decoding scheme based on the table 100, the address register and counter are integrated, thereby minimizing transmission delays. If separate address register, word counter, and register are not needed, this decoding scheme allows the memory device to operate at higher clock frequency.

Figure 2:
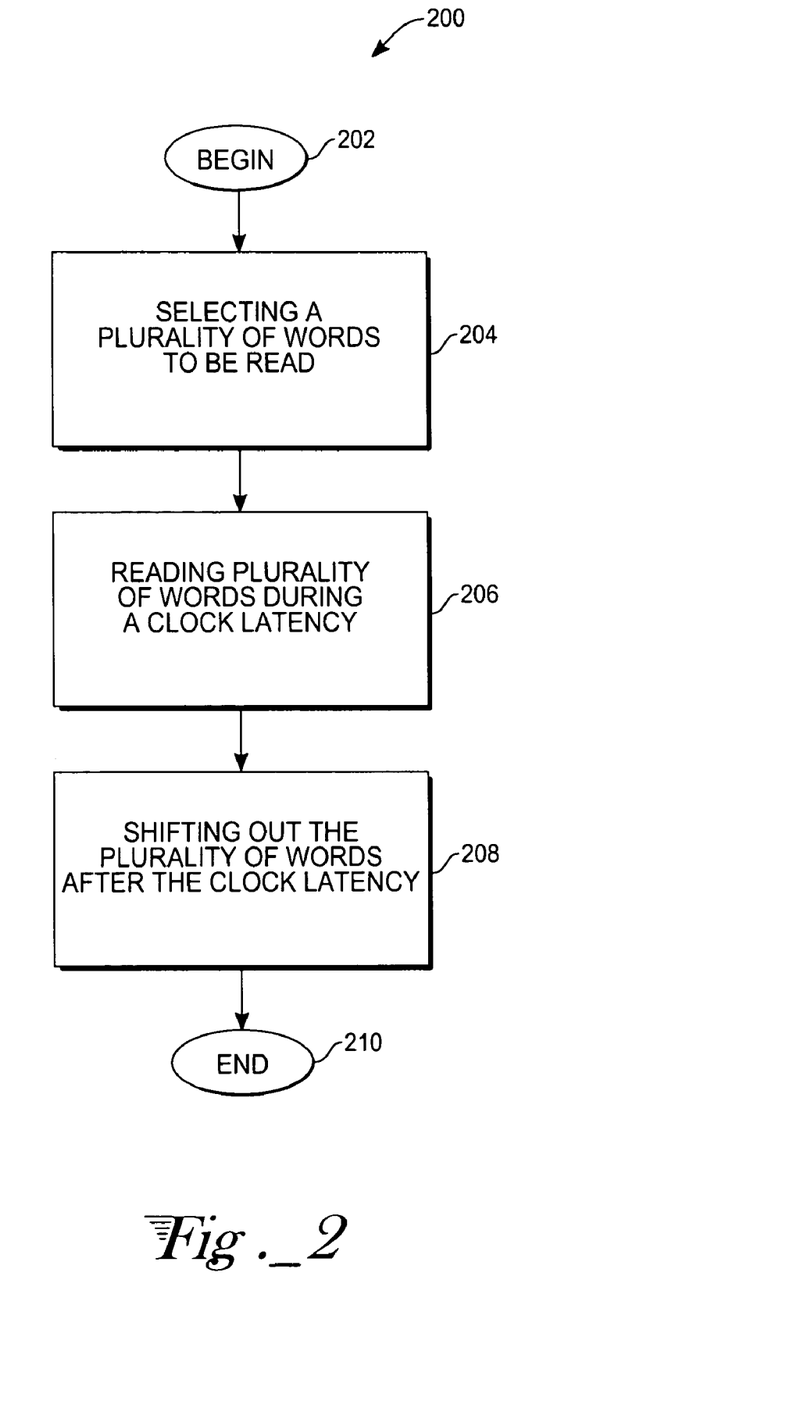
FIG. 2 illustrates a flow chart of a method of two-tier reading in accordance with the present invention.

With reference to FIG. 2, a flow chart 200 of the method of two-tier reading as described in table 100 above is illustrated.

At step 204, a plurality of words (in this example 8) is selected to be read initially, depending on the starting address. If the starting address corresponds to word 0 then words 0–7 are read initially during the latency.

After the boundary of the word 3 and word 6, we start reading words 8 through 11 into the registers that were holding words 0 and 3 previously as these words were already clocked out.

Again at the boundary of words 7 and 8, our scheme reads ahead the words 12 through 15 and stores them in a register to be clocked out later while words 8–11 are being synchronously clocked out.

At step 208, after the selected plurality of words has been read at the end of the clock latency period, the subsequent words are shifted out synchronously during the burst period. The method shown in the flow chart 200 improves speed and throughput because after initial latency the data flows out of the chip synchronously with the system clock.

Figure 3:
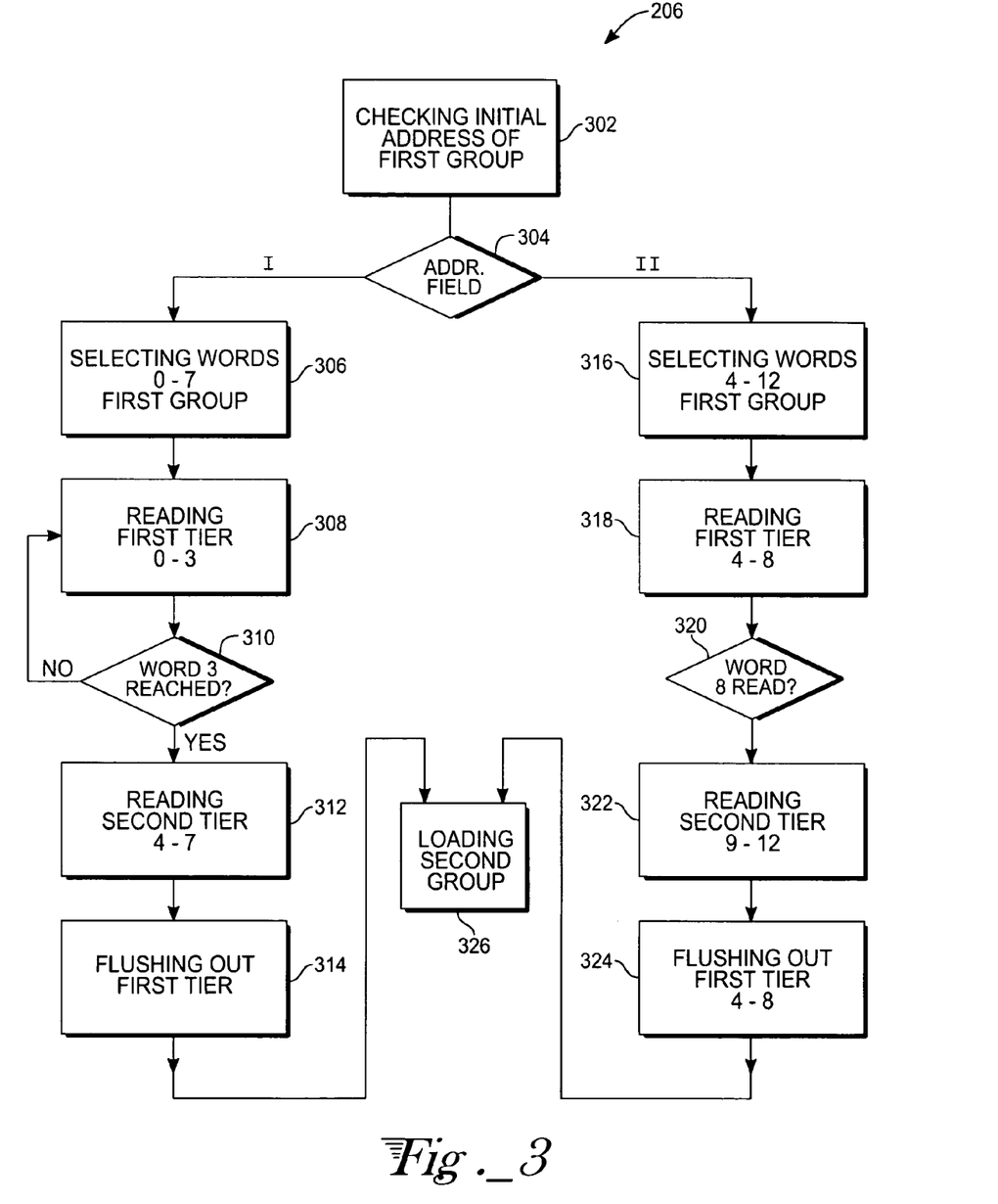
FIG. 3 illustrates a flow chart of the step of reading during a latency period.

With reference to FIG. 3, step 206 of reading multiple words during the latency period further includes the following steps:

At step 302, an initial address of the first group of words to be read is checked. As discussed above, once the plurality of words to be read is selected, address of each of the plurality of words can be decoded by address bits $A_i$ to $A_0$. In an exemplary embodiment, the word length is 8 words. At step 304, the address bit $A_2$ is used to decode, based on the initial address of the first group of words, the address field to which the first group of words belongs.

For example, if the address field is I, at step 306, the first group of words is selected, i.e., word 0 to word 7. However, if the address field is not address field I, then an alternative branch is taken to step 316.

At step 308, the first group of words is read into a plurality of data registers.

At step 310 the process determines whether the last word of the first tier has been read. If not, the process returns to step 308. Otherwise, the process continues to step 312.

At step 312, the second tier of the first group of words is clocked out. Words 4 to 7 are clocked out.

At step 314, the first tier of words 0 to 3, is flushed out of the data registers, providing room for the subsequent group of words (words 8–11).

At step 326, the subsequent group of words, words 8 to 11 are clocked out.

The process continues as long as the clock is provided for reading synchronous data.

If at the beginning the address field is not I, the method steps taken are similar to those described above with respect to steps 306–314. The only difference is that the steps begin at words 4 to 11, for example, instead of words 0 to 3.

At step 316, words 4 to 11 are selected.

At step 318, the first tier words 4–11 are read into a plurality of data registers.

At step 320, a determination is made whether the last word of the fist tier has been read. If not, the process returns to step 318. Otherwise, the process continues to step 322, clocking out.

At step 324, the first tier of words are flushed from the plurality of data registers.

At step 336, the subsequent group of words, words 12 to 15, are loaded into the plurality of data registers.

Figure 4:
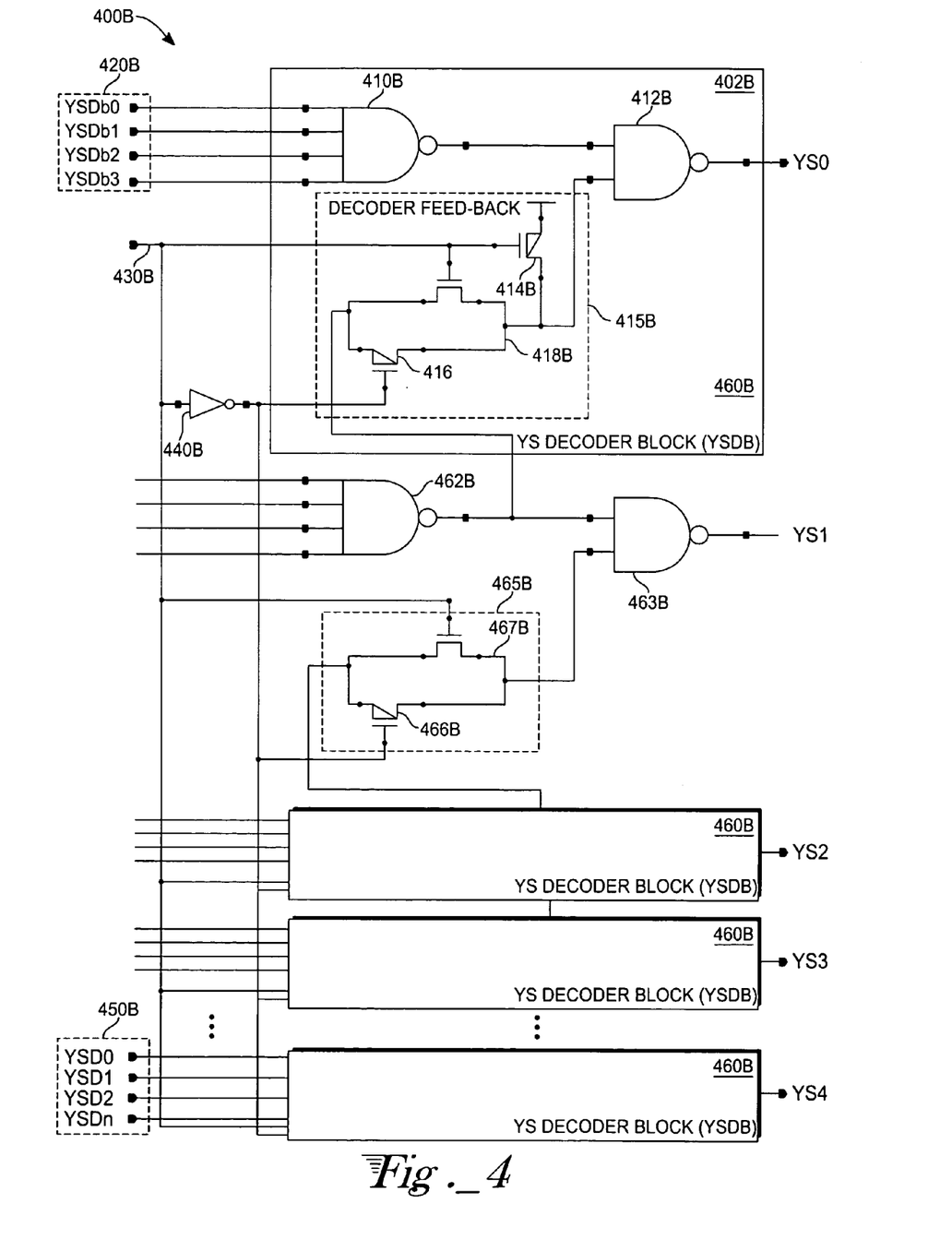
FIG. 4A illustrates a block diagram of a two-tier decoder in connection with a main bit line and sense amplifier array of a memory system.
FIG. 4B illustrates a schematic diagram of a second tier decoder in accordance with the present invention.
Figure 4A:
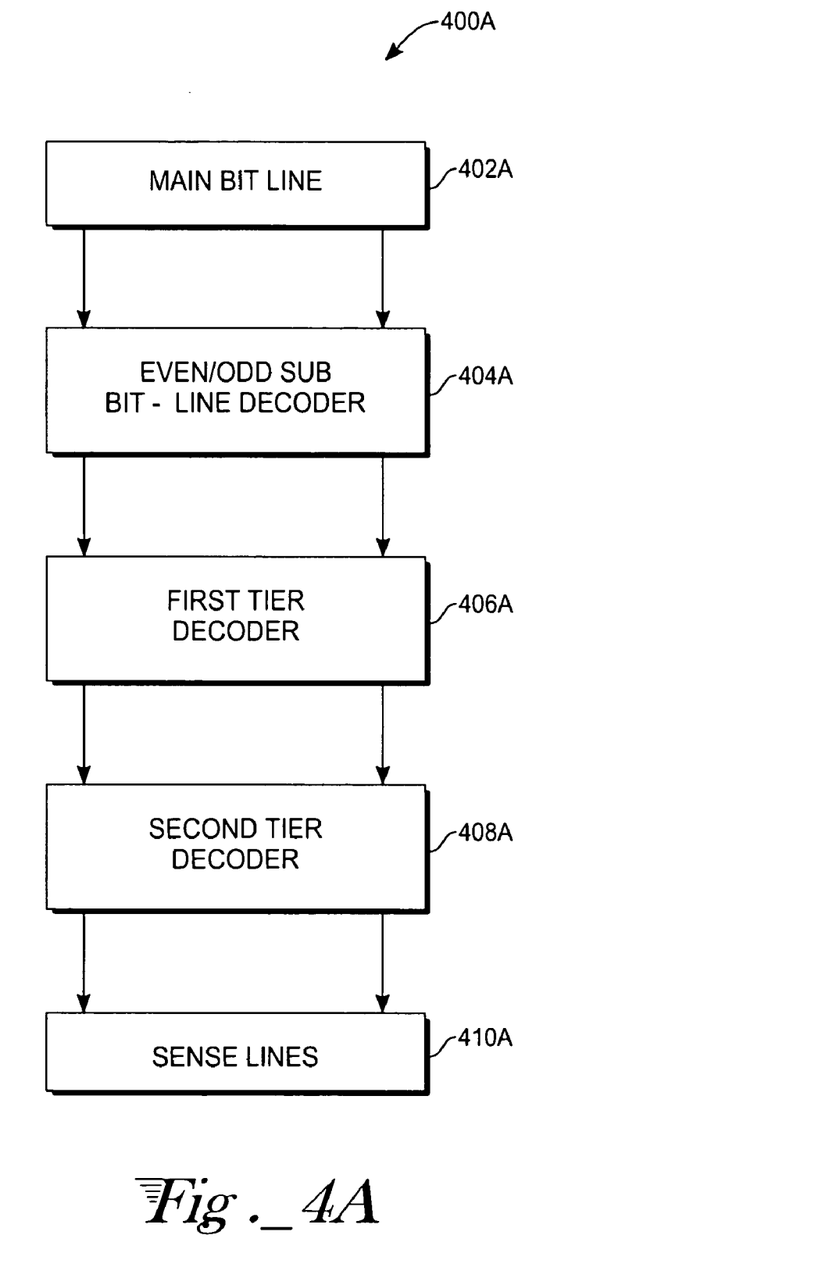

The above method is implemented in another aspect of the present invention by a two-tier column decoder. With reference to FIG. 4A, an exemplary two-tier column decoder 400A has a main bit line 402A of a memory system (not shown) coupled to an even/odd sub bit line decoder 404A. The two-tier decoder 400A has a first tier decoder 406A for retrieving all odd and even addresses for a first read during the clock latency period. The first tier decoder is used in step 206 of the two-tier method of flow chart 200 of FIG. 2, and steps 306 to 326 of FIG. 3. In addition, the two tier decoder 400A also has a second tier decoder 408A. The second tier decoder 408A is used in step 206 of FIG. 2. The second tier decoder 408A selects either low or high order words.

As discussed above, after a plurality of words is selected to be read, the bit line decoder 404A decodes an initial address by examining, for example, three address bits $A_0$, $A_1$, and $A_2$. The most significant bit $A_2$, and bits $A_0$, $A_1$ define whether the initial address is in address field I or other address fields. Afterward, the first tier decoder 406A is responsible for selecting both even and odd addresses to read them into data registers (not shown). The first tier decoder 406A reads the first group of words and checks whether the last word of the first tier has been read by checking the contents of address bits $A_2$, $A_1$, and $A_0$. If $A_2$ equals 0, $A_1$ equals 0, and $A_0$ equals 0 at the beginning, the initial address of the word to be read is in address field I. See Table 100, FIG. 1. The initial address is also an even address because the first tier decoder 406A detects the address bit $A_2$ to be zero. The first tier decoder 406A decodes words 0 to 7 from the main bit line 402. During the clock latency period, words 0 to 7 are read into data registers (not shown). As soon as the first tier (word 0 to 3) are read, the first tier decoder 406A detects the address bit $A_2$ as the address changes from 0 to 1. Then, the second tier of words is read into data registers and the first tier is flushed out. See FIG. 3, steps 306 to 314. Subsequently, the subsequent group of words is loaded into the data registers in place of the first tier of the first group. As a consequence, after the clock latency period, the register counter is incremented by one and the second group of words are read during the burst period. The second tier decoder 408A examines bits $A_2$ to $A_i$ and decodes either even or odd addresses for subsequent burst mode reading. Thus, during the burst mode reading, only four words are selected. These four words are either even or odd, depending on the detection of the address bit $A_2$ by the second tier decoder 408A.

A plurality of sense lines 410A sense out the words from the data registers. In an exemplary embodiment, the sense lines have 128 sense amplifiers which can sense up to eight sixteen bit words for an initial read during the clock latency period.

Figure 4B:
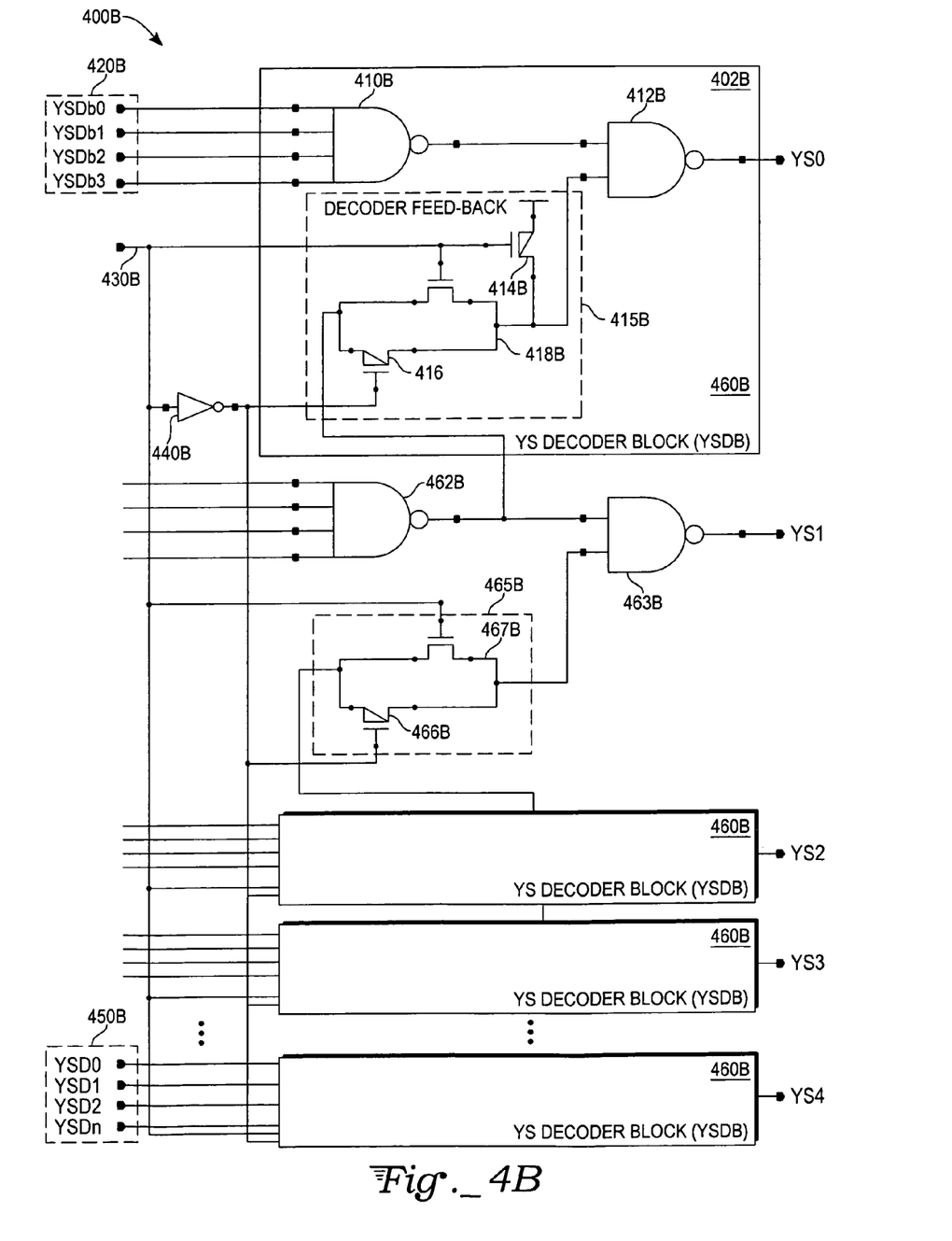

FIG. 4B illustrates a schematic diagram of a two tier decoder 400B. The two tier decoder 400B has a first decoder block $402B_1$ and a plurality of subsequent decoder blocks $402B_2$ through $402B_i$. The second tier decoder 400B is a decoder with a feedback block that feeds back the decoding signal to the previous decoded lines when a plurality of words are being read simultaneously during the initial read during the clock latency period. After the initial read, the feedback path is rendered ineffective and the second tier decoder 400B functions as a normal decoder. In this case, only one line is selected for one unique address input because one word is read per clock and four words at a time during synchronous reading or burst mode reading period, step 208 of FIG. 2.

The second tier decoder 400B has a plurality of decoder blocks $402B_1$ through $402B_i$. The first decoder block $402B_1$ has N input terminals 420B connected to N different lines from the address registers (not shown) of the selected words to be read. These input terminals are coupled to a first NAND gate 410B. The output of the first NAND gate 410B is input to a second NAND gate 412B. Another input to the second NAND gate 412B is a feedback signal from a decoder feedback 415B. The feedback decoder 415B receives a signal from the first NAND gate 410B of a subsequent decoder block $402B_2$. In an exemplary embodiment, the decoder feedback 415B comprises a first PMOS transistor 416B coupled in parallel to an NMOS transistor 418B. The drains are coupled together and to an output of the first NAND gate 462B from the subsequent decoder block $402B_2$. The sources are coupled together and to a second input of the second NAND gate 412B. The sources are also coupled to a source of a second PMOS transistor 414B. The second PMOS transistor 414B is a pull up transistor with its drain coupled to a supply voltage 417B. Its gate is coupled to the gate of the NMOS transistor 418B and to an input signal indicating the read of all eight-word signal 430B (RD8WRD). The reading of all eight-word signal 430B (RD8WRD) indicates whether it is a first read or subsequent read. An inverse of the read of all eight-word signal 430B (RD8WRD) is achieved via an inverter 440B and is input to the gate of the first PMOS transistor 416B.

The subsequent decoder blocks $402B_2$ through $402B_i$ are similar to the first decoder block 402B except that the decoder feedback 465B does not have a pull up PMOS transistor 414B. The subsequent decoder blocks $402B_2$ through $402B_i$ have a first NAND gate 462B, a second NAND gate 463B, and a feedback decoder 465B. The connections are similar to the first decoder block $402B_1$.

During a first read, the read of the all eight-word signal 430B (RD8WRD) is HIGH, causing the second PMOS transistor 414B to be in a cutoff state. The NMOS transistor 418B is ON, and the first PMOS transistor 416B is ON. This causes a feedback signal from the output of a first NAND gate 410B of a subsequent decoder block $402B_2$ through $402B_j$ to be connected to the second NAND gate 412B of the previous decoder block 402B$_1$. Thus, the second tier column decoder 400B can read all eight words during this first read period.

However, during the second read, the read all eight word signal 430B (RD8WRD) is LOW, so the feedback signal is cut off or ineffective. When the read all eight word signal 430B (RD8WD) is LOW, the pull-up PMOS transistor 414B is ON, pulling the input of the second NAND gate 412B of the first decoder block 402B$_1$ to HIGH. Both the first PMOS transistor 416B and the NMOS transistor 418B are in cut off state, disconnecting the subsequent decoder block 402B$_2$ and the first decoder block 402B$_1$. Thus, during this stage, the two-tier decoder 400B can only read four words at a time. And these four words are from the input terminals 420B.

Figure 5:
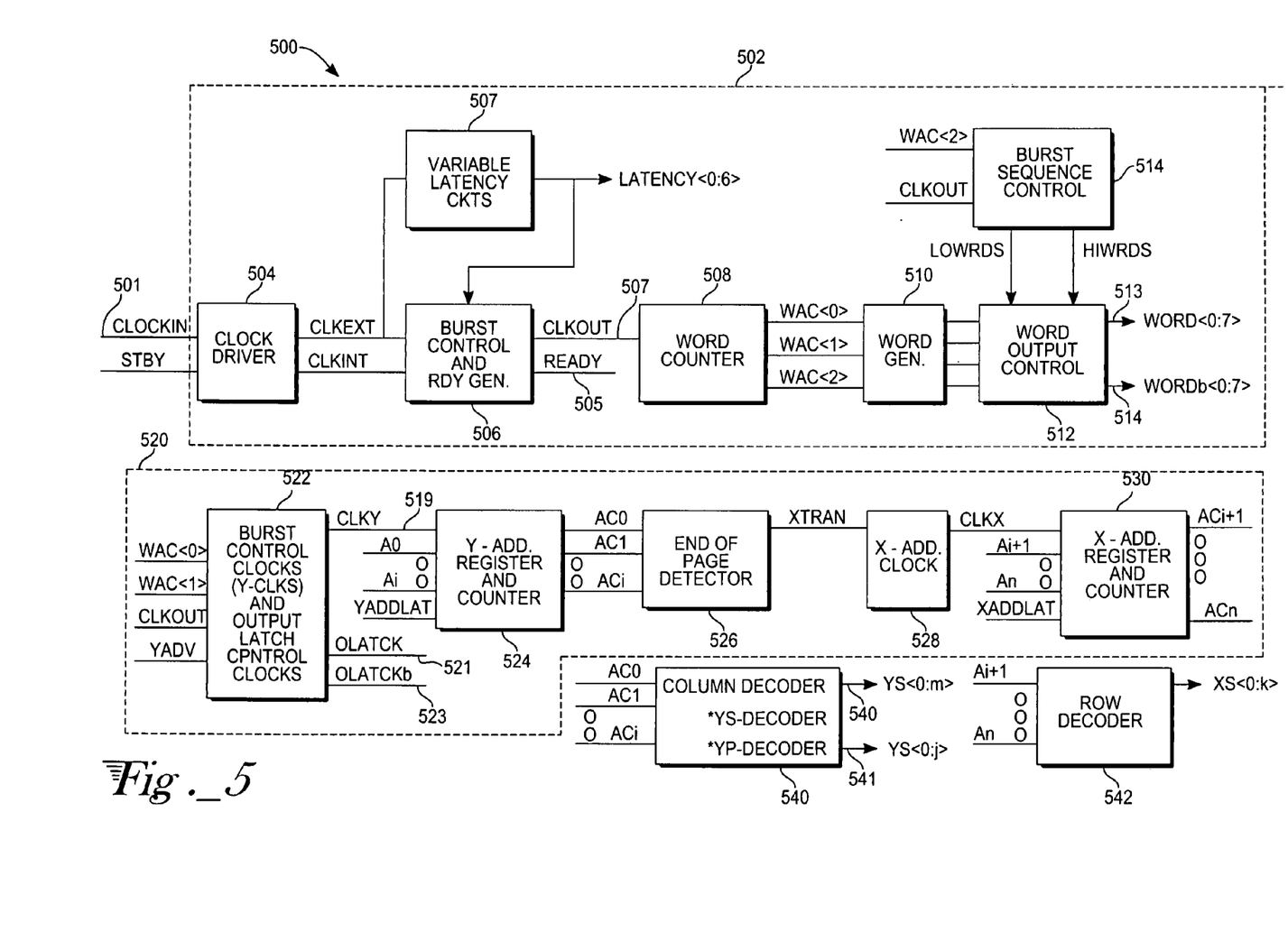
FIG. 5 illustrates a block diagram of a burst operation system that uses a two-tier decoder in accordance with the present invention.

With reference to FIG. 5, a block diagram shows the main blocks of a burst operation system 500 responsible for the fast synchronous mode operation. The burst operation system 500 comprises mainly a burst controller 502, an address controller 520, a two-tier column decoder 540, and a row decoder 543. The burst controller 502 is adapted to receive an input clock signal 501 (CLKIN) at the clock driver block 504 to produce an external clock signal CLKEXT and an internal clock signal CLKINT. A variable latency circuit block 507 receives the external clock signal CLKEXT to produce a latency signal LATENCY. A burst control and ready generator 506 receives the latency signal LATENCY to produce a ready signal 505 (READY) and an output clock signal 503 (CLKOUT). A word counter 508 receives the output clock signal 503 (CLKOUT) and is combined with a word generator 510, a burst sequence control 514, and a word output control circuits 512 to produce a plurality of words to be read 513, 515 (WORD, WORDb).

The READY signal 505 is asserted during burst operation and de-asserted at the page boundaries. The word counter 508 generates the enabling signals for word output control 512. The burst control clocks CLKY 519, OLATCK 521, and OLATBKb 523 are generated from a burst control clocks and output latch control clocks 522 and the output clock signal 503 (CLKOUT) and word counter outputs. The burst control clock CLKY is used to advance the Y-address register-counter (Y_ADD register-counter) 524. The end of page detector 526 triggers the X direction transition signal 527 (XTRAN) which is used to generate the X clock 529 (CLKX) via an X-ADDRESS clock 528. The X-clock 529 (CLK X) increments the X address register-counter 530 (X-ADD register-counter). The output latch control clocks 521 (OLATCK) and 523 (OLATCKb) are used to load the output data latches. The column decoder 540 is comprised of two level decoding and is controlled by the outputs of the Y_ADD register-counter 524.

Figure 6:
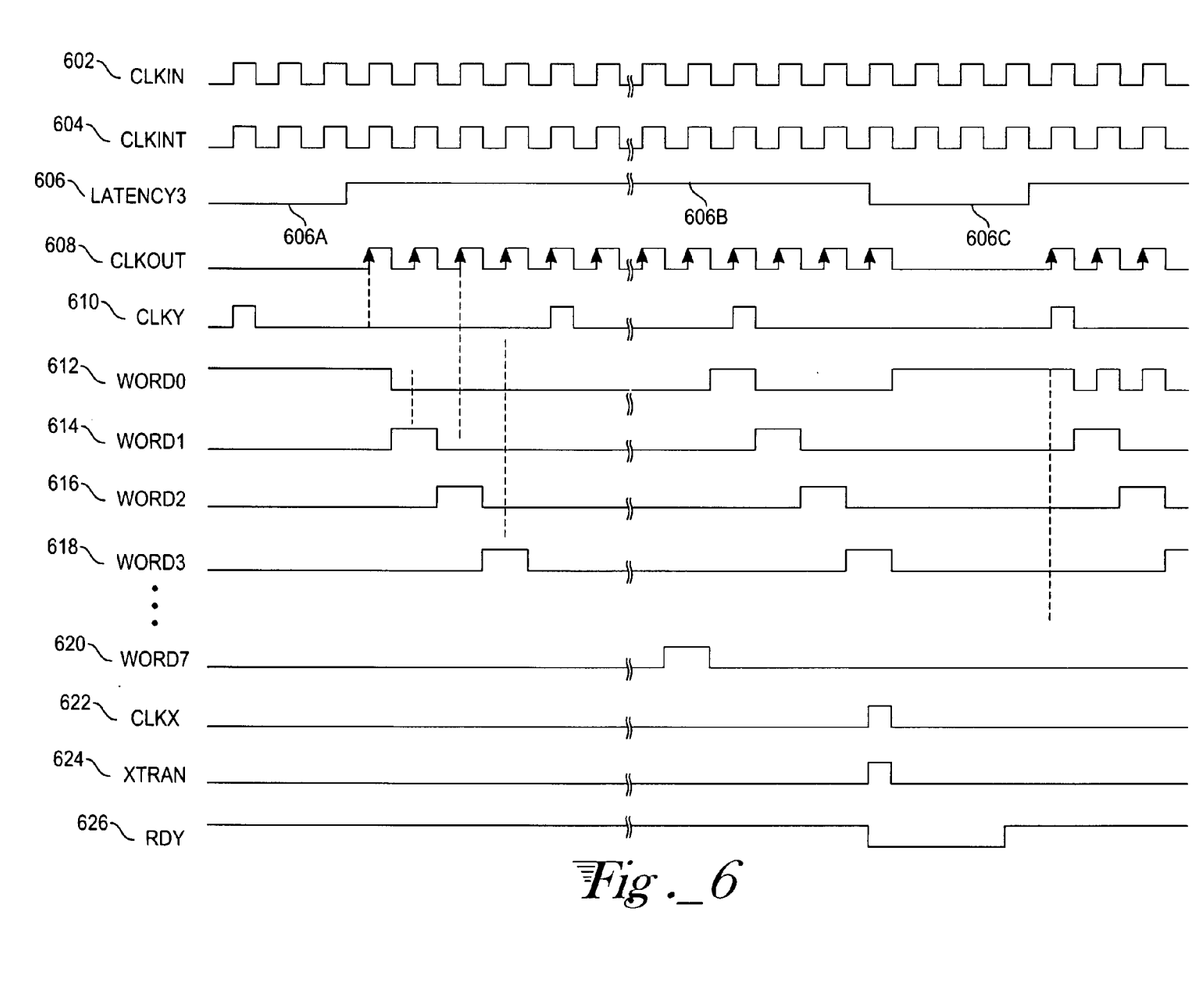
FIG. 6 illustrates timing diagrams of the burst operation system shown in FIG. 5.

The operation of the burst mode read system 500 can be explained by a timing diagram 600. The timing diagrams show some waveforms for burst mode operation after a latency period.

The input clock signal 602 CLKIN is used to generate an internal clock signal 604 CLKINT, internal to the burst operation system 500. A latency waveform 606 is set by a variable latency clock 507 in FIG. 5. The latency waveform has initial read period 606A, a burst mode read period 606B, and a latency page boundary 606C. During the latency initial read period 606A, the process of two-tier reading as described in FIG. 1 and FIG. 2 occurs. Right after the latency initial read 606A, the burst mode reading occurs in burst mode read period 606B, indicated as HIGH in the waveform 606. The burst mode reading continues until the page boundary 606C is reached.

During the burst period 606B, the output clock signal 608 CLKOUT clocks out data at the rising edge of the clock signal. The burst control clock 610 CLKY increments column address after every four words.

Words 0 through 7 represented by waveforms 612 to 620 are shifted out synchronously during the burst mode period 606B of the latency period.

The X clock 622 CLKX increments the row address.

The ready signal 626 RDY is asserted during the burst mode and de-asserted at the page boundary.

The first output clock 610 CLKY is generated as soon as an input address is loaded to the address registers. This provides the first increment for the decoder operation described above where two lines are selected simultaneously for the initial read of eight words. Subsequently, CLKY is generated in accordance to the word boundaries.

Although the present invention has been described with respect to specific exemplary embodiments, one skilled in the art will recognize that certain changes and substitutions can be made that are still within the scope of the present invention.

For example, each group of words in a plurality of words to be read is eight-words long. A skilled artisan will realize that each group of word can be any number of words. As such, the first tier and subsequent tier can be any number of words, neither than four words as indicated in the exemplary embodiment.

Yet in another example, the components of burst reading system 500 used in the exemplary embodiment of the present invention can be substituted by other that perform the same functions as the word counter, end of page detector, register and counter, etc. that will not change the essence of the present invention.

What is claimed is:

1. A method of synchronous reading for a plurality of words in a memory system, comprising:
    selecting said plurality of words to be read, said selected plurality of words having a first group of words and at least one subsequent group of words;
    reading said first group of words of said selected plurality of words into a plurality of data registers during a latency period; wherein said step of reading comprises determining from said selected plurality of words which said first group of words is to be read, said first group of words having a first tier and a subsequent tier;
    reading said first tier of said first group of words into said plurality of data registers at the beginning of said latency period; and
    shifting out each word of said first group of words of said selected plurality of words synchronously at the end of said latency period, one word of the first group of words shifted out at each clock cycle following the latency period until each word of the first group of words has been shifted out.

2. The method of claim 1, wherein said step of reading further comprises the following steps:
    deleting said first tier of said first group of words from said plurality of data registers after said reading step during said latency period;
    loading said first tier of said subsequent group of words into said plurality of data registers after said step of deleting during said latency period; and
    reading said subsequent tier of said first group of words into said plurality of data registers after said step of loading during said latency period.

3. The method of claim 2, wherein the step of determining which said first group of words to be read further comprising:
checking whether an address field of said first group of words to be read belongs to a first address field or a subsequent address field, if said address field of said first group of words belongs to first address field then
selecting said first tier of words whose address coincides with an initial address of said first tier of words; otherwise
selecting said first group of words whose address coincides with an initial address of subsequent tier of words.

4. The method of claim 2, wherein the step of reading said first tier of said first group of words further comprises checking whether a last bit of said first tier of words has been reached, if said last bit of said first tier of words has not been reached, continuing reading; otherwise
continuing to read said subsequent tier of words.

5. A two-tier column decoder to facilitate synchronous reading of a plurality of words in a memory system, comprising:
a most-significant-bit decoding means for decoding a most significant bit of said plurality of words to be read and determining whether an address of said plurality of words is a lower or a higher address, said means being coupled to a main bit line of said memory system;
a first selecting means for selecting both even and odd addresses for a first reading during a latency period, said first selecting means coupled to said decoding means;
a second selecting means coupled to said first selecting means, said second selecting means for selecting either an even or odd address for a subsequent reading;
wherein the first and second selecting means each have a plurality of input terminals, an output terminal, and a feedback terminal for determining whether said plurality of words is either said odd or even address.

6. The two-tier column decoder of claim 5, wherein each selecting means further comprises:
a first logic means adapted to receive said plurality of input terminals for producing a status signal of said plurality of input signals;
a second logic means adapted to receive said status signals for producing a signal that determines whether said plurality of input terminals are in said even or odd address;
a plurality of transistor feedback means adapted to receive a feedback output signal from a subsequent decoding means and coupled to said logic means for providing a status of said subsequent decoding means.

7. A burst mode operation system for fast synchronous reading of a memory system, comprising:
a burst controller adapted to receive an input clock signal, a variable latency signal, and a burst sequence control signal from said memory system to produce a plurality of words to be read and an output clock signal, the burst controller further comprising:
a clock driver adapted to receive said input clock signal to produce an internal and an external clock signal;
a burst control and ready generator adapted to receive said internal clock signal, said external clock signal for producing said output clock signal and a page boundary signal;
a word counter coupled to said output clock signal for producing a plurality of word address counts;
a burst sequence control adapted to receive one of said plurality of word address counts and said output clock signal for producing a plurality of read signals; and
a word generator coupled to said word counter and a word output controller for producing said plurality of words to be read;
an address controller coupled to said burst controller for producing addresses of said plurality of words to be read;
a two-tier column decoder adapted to receive said addresses from said address controller for producing a first tier address and a second tier address; and
a row decoder adapted to receive said addresses from said address controller for producing row addresses of said plurality of words to be read.

8. The burst mode operation system of claim 7, wherein said address controller further comprises:
a burst control clock device adapted to receive said output clock signal, said plurality of word address counts to produce at least one burst control clock signal;
a Y-address register and counter adapted to receive said output clock signal and said addresses of said plurality of words;
an end of page detector adapted to receive a plurality of address counter signals from said Y-address register and counter to produce an end of page signal;
an X-address clock adapted to receive said end of page signal to produce an X-clock signal; and
an X-address register and counter adapted to receive said X-clock signal, and addresses of said plurality of words to be read.

9. A two-tier column decoder to facilitate synchronous reading of a plurality of words in a memory system, comprising:
a sub bitline decoder coupled to a main bit line of said memory system for decoding a most significant bit of said plurality of words to be read and for determining whether an address of said plurality of words is for a lower or higher word address;
a first tier decoder coupled to said sub bitline decoder to select both said even and odd addresses of said plurality of words for a first reading during a latency period; and
a second tier decoder coupled to said first tier decoder to select either said lower or higher word addresses for a subsequent reading, said second tier decoder including an array of decoder blocks coupled to one another, each having a plurality of input terminals, an output terminal, and a feedback terminal for determining whether addresses of said plurality of words is said lower or higher order.

10. The two-tier column decoder system of claim 9, wherein each decoder block further comprises:
a first NOR logic gate adapted to receive said plurality of input terminals;
a second NOR logic gate adapted to receive an output of said first NOR logic gate; and
a plurality of transistors coupled together to receive a feedback signal from a subsequent decoder block and coupled to said second NOR logic gate.

* * * * *